United States Patent
Everett

[15] 3,698,139
[45] Oct. 17, 1972

[54] AUTOMATIC BALANCING DEVICE

[72] Inventor: Cecil D. Everett, West Boylston, Mass.

[73] Assignee: The Warner & Swasey Company, Cleveland, Ohio

[22] Filed: Sept. 14, 1970

[21] Appl. No.: 71,760

[52] U.S. Cl............51/237 R, 51/169, 73/487, 74/573
[51] Int. Cl...........................B24b 41/04
[58] Field of Search..........73/66, 458, 480, 481, 487; 51/237; 74/573

[56] References Cited

UNITED STATES PATENTS

| | | | |
|---|---|---|---|
| 3,128,582 | 4/1964 | Winther | 51/237 CS |
| 2,494,569 | 1/1950 | McMaster | 51/237 CS |
| 2,961,806 | 11/1960 | Strand | 51/237 CS |

*Primary Examiner*—Harold D. Whitehead
*Attorney*—Thomas L. Tarolli and Calvin G. Covell

[57] ABSTRACT

An automatic balancing device for use on a machine tool adapted to perform the same or a similar machining operation on a series of differently balanced workpieces. The workpieces are received at the machine tool in a random sequence and the machine tool performs a common automatically cycled machining operation upon each workpiece while it is supported by a workpiece holder in the machine tool. The workpiece holder is mounted within a fixed housing on the machine tool for rotation about a predetermined axis during each machining operation and the machine tool is stopped between succeeding machining operations to allow a workpiece to be loaded and unloaded. The balancing device includes a balance weight which is automatically movable between supports therefor on the workpiece holder and on the housing in response to a signal indicating that succeeding workpieces delivered to the workpiece holder are differently balanced about the axis of rotation of the workpiece holder.

13 Claims, 7 Drawing Figures

INVENTOR.
CECIL D. EVERETT

ATTORNEY

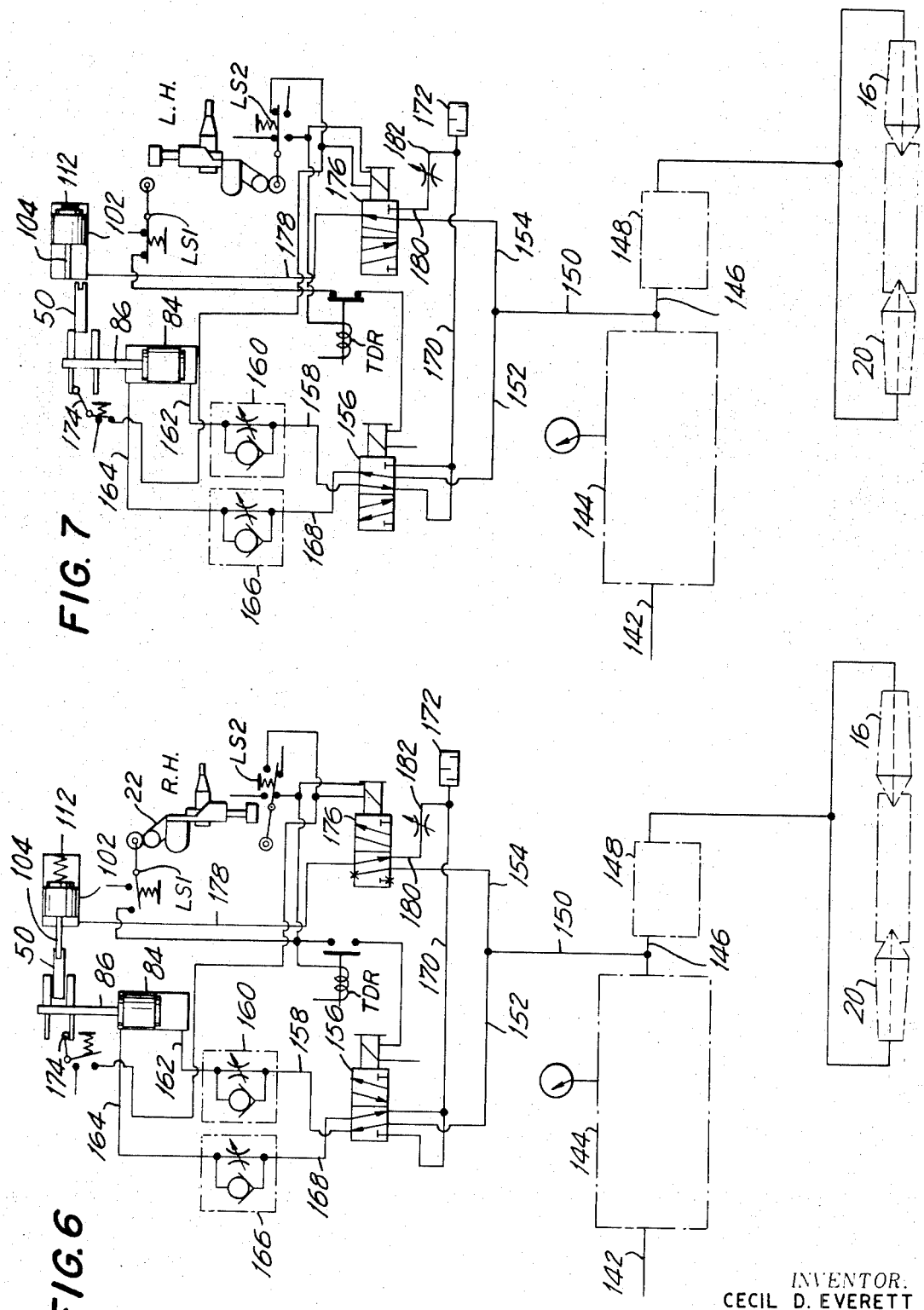

3,698,139

AUTOMATIC BALANCING DEVICE

The present invention relates to a balancing device for use on a machine tool adapted to perform the same or a similar machining operation on a series of differently balanced workpieces and, more particularly, the invention concerns an automatic balancing device which automatically shifts a balance weight to a rotating workpiece holder responsive to a signal indicating that a particular workpiece upon which the next machining operation is to be performed is balanced differently than a preceding workpiece.

In the design of machine tools for production line application, for example, machine tools used on mass produced parts in the automotive industry, where similar repetitive machining operations are to be performed, a number of factors must be evaluated in the design and selection of a particular machine tool so as to maximize its effectiveness and efficiency. Some of the factors to be considered are initial cost and complexity of the machine tool, adaptability to various machining operations, automation of the machining operations to eliminate direct manual labor and to control the machining operations to insure uniformity from workpiece to workpiece for quality control standards. Accordingly, the trend in the design of machine tools for production line operations is toward the design of more universal machine tools which lend themselves to ready automatic operation at high speeds and which are adaptable to do common machining operations on more than one type of workpiece in order to maximize machine utilization.

Accordingly, it is an object of the present invention to provide an apparatus for use in association with a machine tool which is automatically actuable to increase the utilization of the machine tool to enable it to perform a common machining operation on differently balanced workpieces.

It is a further object of the present invention to provide an automatic balancing device for use on a machine tool adapted to perform similar machining operations on differently balanced workpieces which automatically shifts a weight from a stationary position on the machine tool housing to a position where the weight is engageable with a rotating workpiece holder in order to dynamically balance the rotating workpiece holder and an eccentrically balanced workpiece in order to accommodate various workpieces which are balanced differently about the axis of rotation for the machining operation to be performed.

Yet another object of the present invention is to provide an automatic balancing device for use on a production machine tool such as a grinding machine which automatically shifts a weight back and forth between a non-engaged position and a position engaged with a rotating workpiece holder on the grinding machine in order to dynamically balance the rotating workpiece and workpiece holder in response to a signal indicating that the workpiece on which the grinding operation is to be performed is balanced differently than a preceding workpiece upon which the same or a similar grinding operation was performed.

These and other objects of the invention will become more readily apparent from the following specification when considered in conjunction with the accompanying drawings.

IN THE DRAWINGS

FIG. 6 is a schematic representation of the pneumatic circuitry for the automatic shifting of the balance weight when the weight is in position on the workpiece holder; and FIG. 7 is a view similar to FIG. 4 showing the pneumatic circuitry when the balance weight is removed from the workpiece holder.

In accordance with a preferred embodiment of the present invention, an automatically actuable weight shifting mechanism is provided for use in conjunction with a machine tool, such as a grinding machine, adapted to perform an identical grinding operation on differently balanced workpieces, such as left-hand and right-hand steering knuckles of the type used in automobiles to link the left and right front wheels to the steering assembly. Since both the left-hand and right-hand steering knuckles have a finish ground stub shaft to fit within the left and right front wheel housings, both of these stub shafts are ground to the same dimension. However, due to certain structural design differences between the left-hand and right-hand steering knuckles, these knuckles are balanced differently about the longitudinal axis of the stub shaft to be ground. Hence, when both knuckles are to be finish ground by the same grinding machine, it is necessary to compensate for the dynamic imbalance between the left-hand and right-hand steering knuckles about the axis of rotation of the knuckles while being ground.

In the present invention, a balance weight is provided mounted within a guide track and reciprocable between a first position on the stationary housing of the grinding machine to a second position wherein the balance weight is secured to a faceplate member of the workpiece holder which is adapted to rotate with the headstock spindle of the grinding machine. The balance weight is selected so as to properly dynamically balance the eccentricity between the left-hand and right-hand steering knuckles. Thus, with the balance weight removed from the faceplate of the workpiece holder associated with the headstock spindle, the rotating headstock spindle, workpiece holder and left-hand knuckle are in dynamic balance and, when the weight is engaged on the faceplate, the same condition results for the right-hand steering knuckle. The balance weight is shifted automatically in its guide track responsive to a signal initiated by an automatic loading device associated with the grinding machine which indicates whether a left-hand or right-hand knuckle is the next workpiece to be loaded in the grinding machine. The automatic shifting of the balance weight from the stationary housing of the grinding machine onto the rotatable faceplate of the workpiece holder is accomplished through a pneumatic actuating system.

Figure 1:
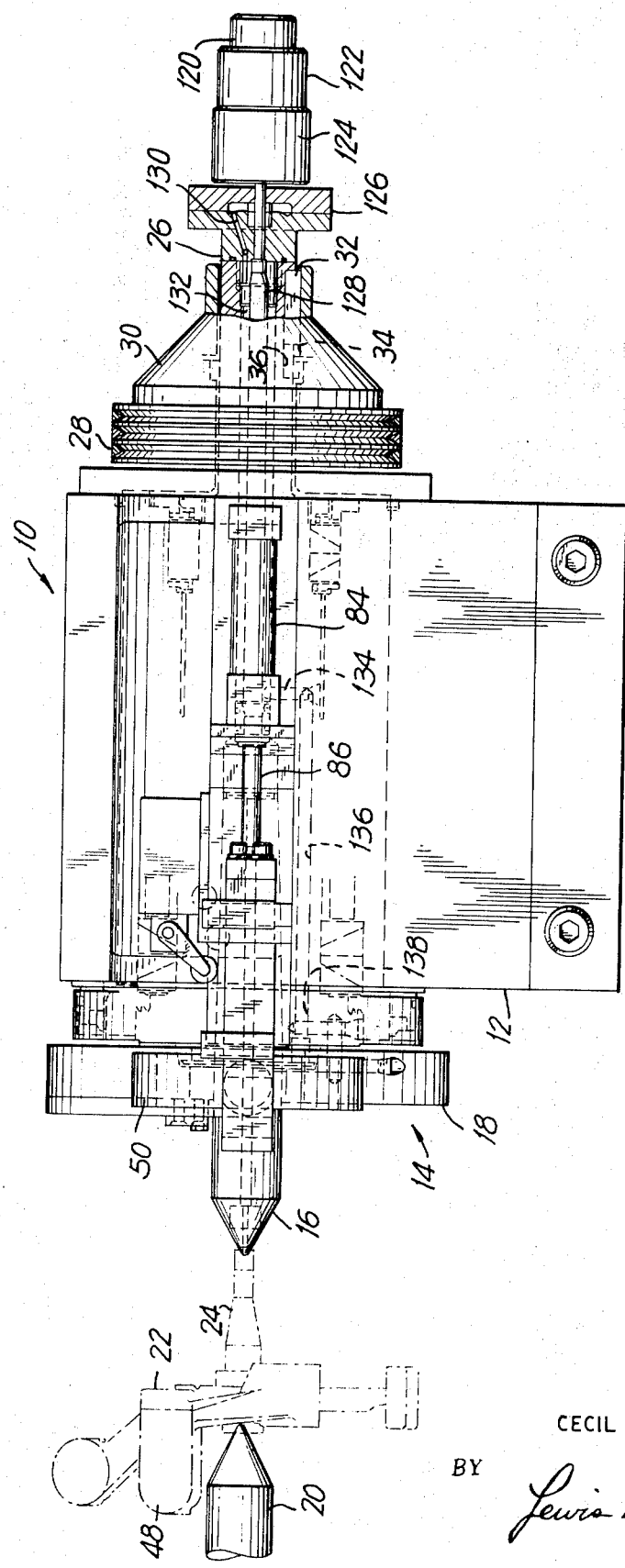
FIG. 1 is an elevational view showing a grinding machine with a workpiece positioned between the headstock and tailstock spindles.

With reference now to the drawings and particularly FIG. 1, there is shown a machine tool, such as a grinding machine 10, which includes a fixed housing 12 within which is rotatably mounted a headstock spindle assembly 14. Headstock spindle assembly 14 includes a rotatable headstock center 16 and a faceplate member 18 secured to the headstock spindle assembly 14 so that faceplate 18 rotates with the headstock center 16. Grinding machine 10 also includes a tailstock center 20 which cooperates with the headstock center 16 to retain the workpiece, for example a steering knuckle 22, therebetween so that the required grinding operation can be performed on the stub shaft 24 of the steering knuckle by a rotating grinding wheel (not shown).

The headstock center 16 includes a spindle shaft 26 which is suitably rotatably journaled within housing 12 and rotative motion is imparted to the spindle shaft 26 to rotate the headstock center 16, faceplate 18 and the workpiece 22 by a motor and belts (not shown) which are adapted to engage the sheaves 28 on a hub 30 at the rear of housing 12. Hub 30 is keyed to the spindle shaft 26 by a key 32 which is retained within key slots 34 in hub 30 and 36 on spindle shaft 26 so that spindle shaft 26 rotates as hub 30 rotates.

Figure 2:
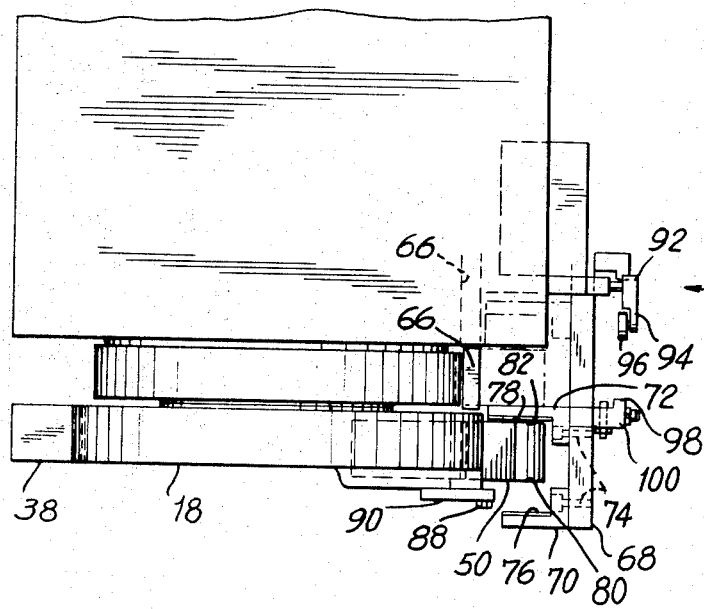
FIG. 2 is a fragmentary plan view showing the faceplate of the workpiece holder and the weight shifting mechanism of the present invention.
Figure 3:
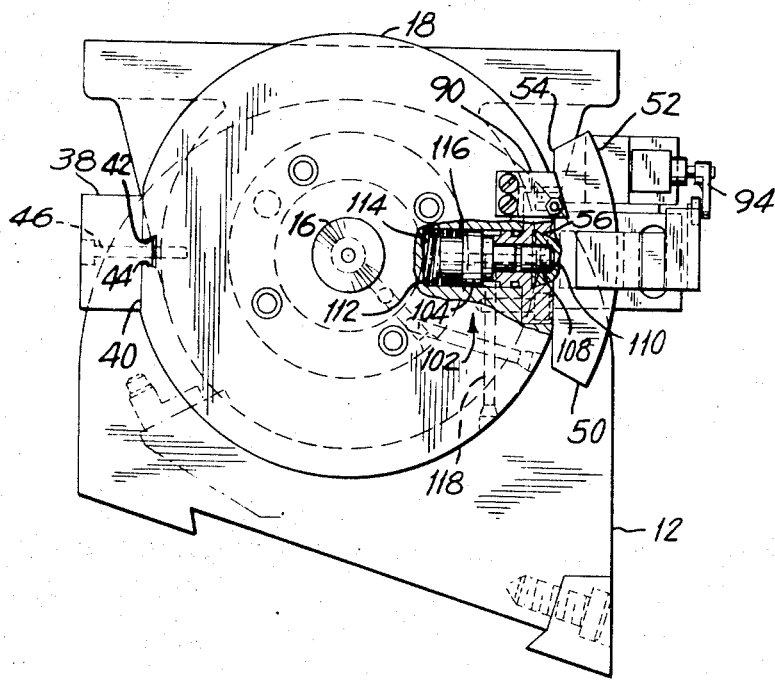
FIG. 3 is a vertical elevational view, partly in section, showing the weight in position upon the periphery of the faceplate of the workpiece holder and the locking means therefor.

With reference now to FIGS. 2 and 3 as well, it is seen that the faceplate 18 may include a counterbalance weight 38 fixed to the periphery of faceplate 18 at a flattened portion 40 thereof. Weight 38 is provided with a dove-tailed extension 42 and the dove-tailed extension is disposed within a dove-tailed slot 44 in faceplate 18. To insure that weight 38 is rigidly secured to faceplate 18, a bolt 46 may be provided to extend through weight 38 to be threadably engaged within faceplate 18. Weight 38 may not be necessary if the workpiece 22 on which the grinding operation is to be performed is not eccentrically balanced so as to require additional balance weights on the rotating faceplate 18. However, for the particular application being described herein, i.e., grinding of the stub shaft 24 on a workpiece such as the steering knuckle 22, such additional weight is necessary in order to balance the eccentricity of the steering knuckle about the longitudinal axis of the stub shaft 24 due to the extending members 48. In the grinding operation described, weight 38 is necessary to balance the left-hand steering knuckle and, in addition, to balance the right-hand steering knuckle and weight 38, it is also necessary to add an additional weight to the rotating faceplate 18 opposite weight 38. Accordingly, an additional balance weight 50 is provided which is automatically positioned in place of rotating faceplate 18 when a right-hand knuckle is to be ground and automatically removed when a left-hand knuckle is to be ground as the balance weight 50 is not needed for a left-hand knuckle.

Figure 4:
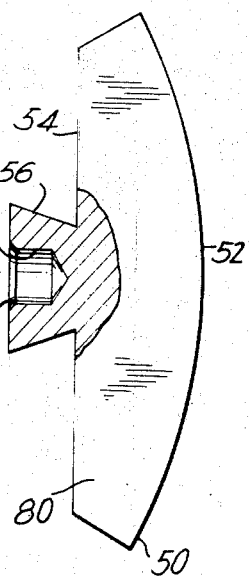
FIG. 4 is an elevational view on an enlarged scale of the balance weight which is shifted to the workpiece holder to dynamically balance the workpiece and workpiece holder about the axis of rotation of the headstock spindle.
Figure 5:
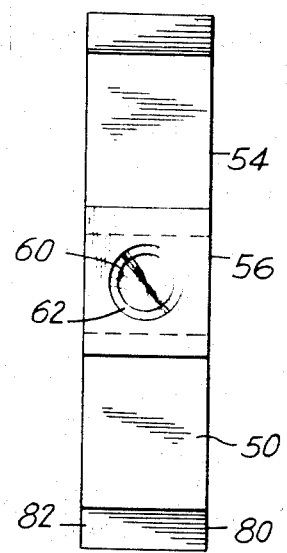
FIG. 5 is an end view of the balance weight shown in FIG. 4.

Balance weight 50 (see FIGS. 4 and 5) is formed with an outer arcuate peripheral portion 52, an inner flattened portion 54 and a dove-tailed shaped member 56 extending outwardly from the flattened portion 54. The dove-tailed shaped member 50 is provided with a centrally located cylindrical recess 60 therein, conically shaped at its inner end for engagement with the chamferred edge 110 of the piston element 104 described in greater detail below, and provided with a countersink 62 at its outer end at the surface of member 56 for a purpose which will be explained more fully hereinbelow.

Balance weight 50 is adapted to slide from a stationary position on housing 12 to a position on faceplate 18 where it is locked to faceplate 18. The mass of weight 50 is such that when faceplate 18 rotates with a right-hand steering knuckle 22 retained between the headstock spindle assembly 14 and tailstock spindle 20, the rotating workpiece holder and workpiece are dynamically balanced about the axis of rotation so that a precision grinding operation may be carried out.

Balance weight 50 is adapted to slide from a stationary position on housing 12 to its position on faceplate 18 in a guide track 66 on housing 12 and in the periphery of faceplate 18, with a guide track 66 adapted to slidably engage the outer surface of the dove-tailed extension 56 on weight 50. A reciprocable slide member 68 including leg extensions 70 and 72 is utilized to slide balance weight 50 along guide track 66 until it is in the proper position to be retained on the periphery of rotating faceplate 18. Leg members 70 and 72 are fixed to slide member 68 by means of bolts 74 and include cutout portions 76 and 78, respectively, which are adapted to abut against the side faces 80 and 82 of balance weight 50 to slide the balance weight along the guide track 66. Legs 70 and 72 are spaced from each other a distance greater than the width of balance weight 50 so that when the weight is secured to faceplate 18 it can rotate freely with faceplate 18 between the legs 70 and 72 of the slide member and additionally, if necessary, to accommodate longitudinal movement of the faceplate 18 accompanying the extension and retraction of the headstock spindle assembly 14.

Movement of the slide member 68 is initiated by a pneumatic cylinder 84 (FIG. 1) rigidly mounted on the exterior of housing 12. An extension member 86 of the reciprocating piston element of pneumatic cylinder 84 is rigidly connected to the rear of slide member 68 so that as the extension member 86 extends, responsive to actuation of pneumatic cylinder 84, slide member 68 extends to push balance weight 50 from its first at rest position on housing 12 to its proper position on the periphery of faceplate 18. When extension member 86 retracts, slide member 68 returns the balance weight to its at rest position on the housing 12. A stop screw 88 positioned in an extending tab 90 fixed to faceplate 18 is provided and may be adjusted to act as an end stop to limit the forward movement of the balance weight 50 and insures its proper positioning on faceplate 18. Cylinder 84 is operably connected to a pneumatic circuit (see FIGS. 6 and 7) which will be explained in greater detail hereinbelow and operates in conjunction with a locking means to secure balance weight 50 on the periphery of faceplate 18.

A limit switch assembly 92 is mounted on housing 12 and includes a spring urged arm member 94 having a contact wheel 96 rotatably mounted thereon which is adapted to engage tab member 98 on an extension 100 of leg 72 on slide member 68. When the extension member 86 is fully retracted by pneumatic cylinder 84, weight 50 slides along guide track 66 to housing 12 and tab 98 contacts and moves arm 94 of limit switch assembly 92 from the full line position shown in FIG. 1 to the rearward broken line position. As extension member 86 extends, leg 72 moves to the left, as shown in FIG. 1, to slide weight 50 along guide track 66 toward faceplate 18 and the limit switch contact arm 94 moves to the left under spring tension to signal movement of weight 50 to the left toward the faceplate 18.

After balance weight 50 has moved to its proper position abutting stop screw 88, faceplate 18 advances with the headstock spindle assembly 14 to provide a clearance between leg member 72 and weight 50 so that weight 50 may rotate freely with faceplate 18 between legs 70 and 72. After weight 50 is in position on faceplate 18 a locking mechanism 102 housed within faceplate 18 is actuated to secure balance weight 50 on the perimeter of faceplate 18.

Locking mechanism 102 includes a piston element 104 slidably retained within a radially directed bore 106 in faceplate 18. Piston element 104 has a cylindrical nose portion 108 adapted to protrude from the surface of faceplate 18 and having a flat end portion with a chamferred peripheral edge 110 to engage countersink 62 and then to be received within the cylindrical hole 60. When nose portion 108 is extended, the chamferred edge 110 of its flat end portion engages the conical inner end portion of the cylindrical hole 60 to force the dove-tailed shaped member 56 of balance weight 50 to move outwardly against the coacting surfaces of the guide track in faceplate 18 to maintain balance weight 50 in fixed relation to faceplate 18.

A coiled compression spring 112 is also provided within bore 106 and has one end abutting the end 114 of bore 106 and its other end abutting a shoulder 116 on the piston element 104 to urge the piston element outwardly. The piston element 104 is retracted by overcoming the tension of spring 112 pneumatically and, for this purpose, an air passage 118 is provided so that air under pressure may be admitted to bore 106. Air passage 118 is located so that air under pressure impinges upon the opposite side of shoulder 116 to force piston 104 to retract against the spring tension 112 when it is desired to disengage balance weight 50 from faceplate 18.

The axial movement of the headstock spindles, shifting of the weight 50 from housing 12 to position on faceplate 18, and retraction of piston 104 of the locking mechanism 102 are accomplished pneumatically although other mechanical and electrical means may also be employed. Accordingly, a supply of air under pressure, preferably from a central source of pressurized air is provided.

Spindle shaft 26 toward the rear of housing 12 and extending beyond is a cylindrical member to provide a delivery passage for pressurized air to actuate the axial extension of headstock spindle assembly 14 and the locking mechanism 102 to secure balance weight 50 to faceplate 18. Air under pressure for the extension of headstock spindle assembly 14 is delivered through central air inlet 120 at the rear of grinding machine 10 and the air under pressure for the locking mechanism 102 is delivered through a concentrically disposed air inlet 122 with both the air inlets 120 and 122 being coupled to a rotating union 124 which delivers both sources of pressurized air through a coupling adaptor 126 to the interior of spindle shaft 126. Pressurized air for the extension of headstock spindle assembly 14 flows through a central air line 128 within spindle shaft 26 which pressurized air for locking mechanism 102 is delivered through by-pass air passage 130 in coupling 126 to the annular space 132 between air line 128 and the interior wall of spindle shaft 26.

The extension and retraction of headstock spindle assembly 14, as well as tailstock center 20, is accomplished in a conventional manner for machine tools and forms no part of the present invention. Hence, further description of this facet of the machine tool operation is omitted. Actuation of the locking mechanism 102 and pneumatic cylinder 84 to shift weight 50 from its position on the housing to its proper orientation on the surface of faceplate 18 is conducted through the pneumatic circuit shown schematically in FIGS. 6 and 7 through appropriate air passage means within housing 12 and faceplate 18.

Pneumatic cylinder 84 is independently operable from the main source of air under pressure with suitable provision to admit air under pressure and exhaust air on either side of the working piston within. To operate a locking mechanism 102, air under pressure may be diverted from annular air passage 132 through an air passage 134 in the wall of spindle shaft 26 to a second air passage 136 within housing 12. A third passageway 138 through the rear portion of faceplate 18 is provided in fluid communication with passageway 136 and a passageway 138 intersects transverse air passage 118 to direct air under pressure into bore 106 where the air under pressure impinges on shoulder 116 to retract piston element 104 so that end portion 110 is disengaged from weight 50.

Passageway 136 within housing 12 is fixed while passageways 134, 138 and 118 rotate as the spindle shaft 26 rotates. The intersection of mating passageways are provided with suitable seals (not shown) and are in register with passageway 136 when faceplate 18 is stopped, for example, by a dynamic brake, at the precise point necessary to insure that weight 50 can slide along guide track 66 to its proper position on faceplate 18.

Reference is now made to FIGS. 6 and 7 which show a schematic representation of the pneumatic circuitry including the solenoid and flow control valves to control the flow of air through the system. FIG. 6 illustrates the circuitry when weight 50 is in position on faceplate 18 and FIG. 7 shows the same circuitry when weight 50 is removed from faceplate 18.

Air from a central supply line 142 is directed through combination air control unit 144 which has takeoff line 146 for air to pass through a center control check unit 148 to operate the extension and retraction of centers 16 and 20. Another takeoff line 150 feeds air under pressure to supply lines 152 and 154 with line 152 connected to a two-position solenoid control valve 156 which, in the position illustrated in FIG. 6, allows air under pressure to flow through a through passage in solenoid control valve 156 to an air supply line 158 and a flow control valve assembly 160. An air supply line 162 from valve 160 supplies air under pressure behind the working piston element of pneumatic cylinder 84 causing piston extension member 86 to extend and shift weight 50 from housing 12 into position on faceplate 18.

While pneumatic cylinder 84 is extending, the air exhausted from the forward end of pneumatic piston 84 is exhausted through line 164 to a second flow control valve 166. A supply line 168 directs the exhausted air through an exhaust passage of the solenoid valve 156 to an exhaust line 170 and through an exhaust muffler 172 to the atmosphere.

When the weight 50 is in position on faceplate 18, as sensed by a limit switch 174, a signal to a second two-position solenoid valve 176 moves the valve 176 to the position shown in FIG. 6 to allow air under pressure within locking mechanism 102 to exhaust through line 178 and a through passage in solenoid valve 176 to an exhaust line 180, needle valve 182, and muffler 172 to the atmosphere. As air is exhausted through line 178 piston element 104 of locking mechanism 102 extends through the action of the spring 112 to secure weight 50 against faceplate 18.

When the weight 50 is to be removed from faceplate 18, solenoid valve 176 is actuated so that a through passage in solenoid valve 176 is in fluid communication with pressurized air from supply line 154. Air flows through supply line 178 into bore 106 to impinge upon the forward end of piston element 104 causing the piston to retract within bore 106 against spring 112 to disengage weight 50 from faceplate 18. After piston element 104 has been retracted, solenoid valve 156 is actuated to the position shown in FIG. 7 so that line 168 is now in fluid communication with pressurized air from line 152 and line 158 is in fluid communication with air exhaust line 170. Consequently, air under pressure is introduced at the forward end of pneumatic cylinder 84 to cause piston extension element 86 to retract and shift weight 50 off faceplate 18. Air is simultaneously exhausted to the atmosphere from the rear of pneumatic cylinder 84 through line 162, control valve 160 and muffler 172.

The position in which the movable balancing weight 50 is maintained for each succeeding grinding operation may be determined by suitable signaling means operative to indicate whether or not the next succeeding workpiece to be delivered to the maching is differently balanced than the preceding workpiece delivered to the machine. For example, in the case of a machine served by an automatic workpiece unloading and loading apparatus, switch assemblies LS1 and LS2 mounted adjacent to the path along which each workpiece is delivered to the machine may be operated selectively by the respective right-hand and left-hand workpieces to initiate movement of the balancing weight 50 from one position to another, whenever the workpiece being delivered to the machine is differently balanced than the next preceding workpiece.

As shown in FIG. 6, a right-hand workpiece has a portion that actuates only the limit switch LS1 which opens a circuit to a time delay relay TDR, solenoid valve 176 and solenoid valve 156, allowing exhaust of fluid therethrough. Limit switch LS2 has two sets of contacts and is at this time in a normal position wherein a set of normally closed contacts are closed but the circuit is maintained open by the held open contacts of limit switch 174 in series therewith.

As shown in FIG. 7, a left-hand workpiece has a portion which actuates only the limit switch LS2 and whereby the normally opened contacts are closed to provide a circuit to solenoid valve 176 and the normally closed contacts are opened. Limit switch LS1 is at this time allowed to return to its normal state whereby the normally closed contacts close a circuit to simultaneously actuate the time delay relay TDR and solenoid valve 176. Locking mechanism 102 is actuated to free weight 50 and then the time delay relay times out and closes its contacts to actuate solenoid valve 156 and cylinder 84. Cylinder 84 removes weight 50 from the face plate and closes normally closed contacts of limit switch 174.

If the next workpiece is right hand, LS2 will reset and its normally closed contacts will maintain solenoid valve 176 and hence locking mechanism 102 in the position shown in FIG. 7 until the contacts of limit switch 174 have been opened by the deactuation of solenoid valve 156 and cylinder 84 by the opening of LS1 by a right-hand workpiece.

It is thus seen that the present invention provides an automatic balancing device for use in a machine tool which performs the same or a similar machining operation on a series of workpieces which are differently balanced about the intended axis of rotation of the workpiece in the machine tool. While the invention has been described in a preferred embodiment in conjunction with a machine tool such as a grinding machine to finish grind workpieces such as left-hand and right-hand steering knuckles, it is, of course, understood that the invention may be employed with equal facility on other machine tools where the workpiece is rotated while a machining operation is performed and for other types of workpieces which are differently balanced. It is also evident that more than one balance weight may be employed, with more than one balance weight or a selected one of a group of balance weights being moved to more than one of a group of positions or to a selected one of a group of positions on a rotating workpiece holder, responsive to the requirements for balancing the particular workpiece in the rotating workpiece holder of the machine tool.

Accordingly, it is to be understood that the preferred embodiment of the present invention described herein is intended to be illustrative and not limiting in any manner as the invention is limited only by the scope of the appended claims.

What is claimed is:

1. An automatic balancing device for use on a machine tool adapted to perform similar machining operations on a series of differently balanced workpieces comprising:

a machine tool including a workpiece holder therein adapted to operatively retain each succeeding workpiece upon which a machining operation is to be performed, said workpiece being selected from said series of workpieces which are differently balanced;

means for rotating said workpiece holder and workpiece whereby said machining operation may be performed on said workpiece while it is rotating;

balance weight means selectively located either in a first fixed position disengaged from said workpiece holder or in a second position engaged with said rotating workpiece holder; and means on said machine tool operative to shift said balance weight means the distance between said first position and said second position responsive to an indication that the next workpiece to be retained by said workpiece holder is differently balanced about the axis of rotation of said workpiece and workpiece holder than the preceding workpiece was.

2. An automatic balancing device as defined in claim 1 wherein:

said machine tool includes a stationary housing; and said balance weight means comprises a balance weight having a mass selected to dynamically balance one of the series of differently balanced workpieces and said workpiece holder about said axis of rotation, and said balance weight is adapted to slide from said first position to said second position along guide track means on said housing and on said workpiece holder.

3. An automatic balancing device as defined in claim 2 wherein:

said means to shift said balance weight the distance between said first position and said second position comprises a reciprocable slide member to slide said balance weight along said guide track means, and reversible means to actuate said slide member selectively operative to shift said balance weight between said first and second positions.

4. An automatic balancing device as defined in claim 3 wherein:

said means to actuate said slide member comprises a pneumatic actuating cylinder fixed to said housing and operatively enclosing a reciprocating working piston member having an extension element secured to said slide member, whereby as said cylinder is actuated to extend and retract said extension element said slide member is reciprocated to shift said balance weight between said first and second positions.

5. An automatic balancing device as defined in claim 1 including:

means to secure said balance weight means on said workpiece holder after said balance weight means has been shifted from said first position to said second position.

6. An automatic balancing device as defined in claim 5 wherein:

said balance weight means comprises a balance weight having a mass selected to dynamically balance the rotating workpiece and workpiece holder about said axis of rotation, and said means to secure said balance weight to said workpiece holder includes means within said workpiece holder selectively extensible to restrainably engage a portion of said balance weight when said balance weight is in said second position.

7. An automatic balancing device as defined in claim 6 wherein said means to secure said balance weight to said workpiece holder further comprises:

a radially directed bore in said workpiece holder;

a plunger element slidably disposed within said bore, said plunger element having a nose portion adapted to be extended beyond and retracted below the peripheral surface of said workpiece holder;

biasing means cooperable with said plunger to extend said nose portion thereby to engage said nose portion with a plunger receiving aperture in said balance weight; and selectively actuable pneumatic means cooperable with said plunger element to overcome said baising means and retract said nose portion from engagement with said balance weight when said balance weight is to be moved from said second position to said first position.

8. An automatic balancing device for use on a machine tool adapted to perform similar machining operations on a series of differently balanced workpieces comprising:

a machine tool, said machine tool including a stationary housing and a rotatable workpiece holder to operatively retain a selected workpiece upon which a machining operation is to be performed, said selected workpiece being selected from said series of workpieces which are differently balanced, a balance weight having a mass selected to dynamically balance said selected workpiece and said workpiece holder about the axis of rotation of said selected workpiece and said workpiece holder when they are rotated during said machining operation, a slide member reciprocably mounted on said stationary housing engageable with said balance weight and actuable to reciprocably slide said balance weight between a first position on said housing and a second position on said rotatable workpiece holder whereby said balance weight rotates with said workpiece holder and said selected workpiece to dynamically balance the rotating members of said machine tool; and selectively actuable securing means within said workpiece holder to secure said balance weight to said workpiece holder after said balance weight has been moved from said first position to said second position.

9. An automatic balancing device as defined in claim 8 including:

a pneumatically actuated cylinder fixed to said housing, said cylinder including a working piston member having an extensible member fixed at one end thereto and at its other end to said slide member, whereby when said cylinder is actuated so that the working piston member reciprocates therein said slide member is reciprocated to slide said balance weight between said first and second positions; and wherein said securing means comprises extendable and retractable plunger means cooperable with said balance weight when extended to secure said balance weight to said workpiece holder and when retracted to disengage said balance weight so that said balance weight can be returned to said first position.

10. An automatic balancing device as defined in claim 9 wherein:

said securing means includes selectively actuable pneumatic means operable on said plunger means to retract said plunger means to disengage said balance weight.

11. An automatic balancing device as defined in claim 10 wherein said pneumatic cylinder and said selectively actuable pneumatic means are connected to a pneumatic circuit comprising:
   a source of air under pressure;
   first air supply means to deliver air under pressure from said source to a first control valve means adapted to selectively direct air under pressure to opposite sides of the working piston member of said cylinder thereby to selectively actuate said cylinder to extend and retract said balance weight between said first and second positions; and
   second air supply means to deliver air under pressure from said source to a second control valve means adapted to selectively direct air under pressure to impinge on said plunger means thereby to retract said plunger means.

12. An automatic balancing device as defined in claim 11 wherein said first control valve means comprises a dual position solenoid controlled valve, said valve including:
   air access passages through said valve when said valve is in one position to permit air under pressure to impinge on one side of the working piston member and be exhausted from the other side; and
   second air access passages through said valve when said valve is in a second position to permit air under pressure to impinge on the other side of said working piston member and be exhausted from said one side.

13. An automatic balancing device as defined in claim 11 wherein said second control valve means comprises a dual position solenoid controlled valve, said valve including:
   an air access passage through said valve when said valve is in one position to permit air under pressure to impinge on said plunger means, whereby said plunger means retracts from said balance weight; and
   a second air access passage through said valve when said valve is in a second position to permit air to be exhausted from a chamber in which said plunger means is housed, whereby said plunger means extends to engage said balance weight.

* * * * *